US012580968B2

(12) United States Patent
Alharbi et al.

(10) Patent No.: US 12,580,968 B2
(45) Date of Patent: Mar. 17, 2026

(54) SYSTEM AND METHOD FOR SECURE DATA EXCHANGE BETWEEN OPERATIONAL TECHNOLOGY SYSTEMS AND EXTERNAL NETWORKS IN AIR-GAP ARCHITECTURE ENVIRONMENT

(71) Applicant: SAUDI ARABIAN OIL COMPANY, Dhahran (SA)

(72) Inventors: Saad A. Alharbi, Dhahran (SA); Bader W. Alkhaldi, Dammam (SA); Ahmad M. Albarrak, Dhahran (SA); Hussain A. Alkhaldi, Dhahran (SA); Saleem E. Alharthi, Dammam (SA); Saad G. Alamri, Dhahran (SA); Mashary F. Alotaibi, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 115 days.

(21) Appl. No.: 18/393,872

(22) Filed: Dec. 22, 2023

(65) Prior Publication Data

US 2025/0133117 A1     Apr. 24, 2025

Related U.S. Application Data

(60) Provisional application No. 63/591,223, filed on Oct. 18, 2023.

(51) Int. Cl.
H04L 9/40          (2022.01)
H04L 67/12          (2022.01)
(52) U.S. Cl.
CPC .............. H04L 63/20 (2013.01); H04L 67/12 (2013.01)

(58) Field of Classification Search
CPC ................................ H04L 63/20; H04L 67/12
See application file for complete search history.

(56) References Cited

U.S. PATENT DOCUMENTS 11,609,994 B2 *  3/2023  Eytan .................... G06F 21/568
12,445,351 B2 *  10/2025  Wittenschlaeger .........................
                                              H04L 41/0806
2024/0416398 A1 *  12/2024  Yang ......................... B08B 9/08

OTHER PUBLICATIONS

No Author; Honeywell Brochure; Secure Media Exchange 2022; Rev 1; Nov. 2022; 13 pages.

(Continued)

*Primary Examiner* — SM A Rahman
(74) *Attorney, Agent, or Firm* — Leason Ellis LLP

(57) ABSTRACT

A system for secure data exchange between an operational technology network and an external information technology network separated by an air gap. The system includes a handheld computing device, a first central station coupled to the external information technology network and a receptacle for detachable coupling to the handheld computing device. The system also includes a second central station coupled to the operational technology network and a receptacle for detachable coupling to the handheld computing device. The system manages secure file transfers between the first central station and the second central station in which a file is uploaded to the detachable handheld device, and in which the handheld device is detachable and moveable from the first central station to the second central station or vice versa. Thereafter, the handheld device is attachable to the central station to which it has been moved to enable secure downloading of the file.

17 Claims, 5 Drawing Sheets

(56) References Cited

OTHER PUBLICATIONS

No Author; A solution Guide to Operational Technology Cybersecurity; Fortinet; White Paper; Mar. 1, 2021; 24 pages.

Navaneeth et al; Secure File/Data Transfer Between Airgap Network; International Journal of Scientific Research in Science, Engineering and Technology, vol. 8, Issue 4, Jul.-Aug. 2021.

Sehn, Tim, "Transferring Data In and Out of Air-Gapped Networks | DoltHub Blog", Jun. 26, 2023 (Jun. 26, 2023), pp. 1-15, XP093235979, Retrieved from the Internet: URL:https://web.archive.org/web/20230627201436/https://www.dolthub.com/blog/2023-06-26-air-gap-network/ (13 pages).

Suzaki, Kuniyasu et al: "DeviceVeil: Robust Authentication for Individual USB Devices Using Physical Unclonable Functions", 2019 49TH Annual IEEE/IFIP International Conference on Dependable Systems and Networks (DSN), IEEE, Jun. 24, 2019 (Jun. 24, 2019), pp. 302-314.

International Search Report and Written Opinion for corresponding PCT Application No. PCT/US24/51911 dated Dec. 20, 2024 (10 pages).

* cited by examiner

AIR GAP

OT NETWORK

SYSTEM AND METHOD FOR SECURE DATA EXCHANGE BETWEEN OPERATIONAL TECHNOLOGY SYSTEMS AND EXTERNAL NETWORKS IN AIR-GAP ARCHITECTURE ENVIRONMENT

CROSS-REFERENCE TO RELATED APPLICATIONS

The present invention claims priority to U.S. Provisional Patent Application Ser. No. 63/591,223, filed Oct. 18, 2023, which is incorporated by reference herein in its entirety.

FIELD OF THE DISCLOSURE

The present disclosure relates to computing network systems and more particularly relates to securing data exchanges between an operational technology network (OT) and an information technology network (IT) across an air gap.

BACKGROUND OF THE DISCLOSURE

Many organizations deploy and maintain operational technology (OT) systems and networks which are distinct and separate from any information technology (IT) systems and networks that they may host and maintain. "Operational technology" refers to hardware or software that monitors and controls physical devices, processes, and events. For example, in the oil and gas industrial context, OT can include hardware and software that controls valves in pipelines infrastructure.

Typically, OT networks are isolated from IT networks for security reasons. That is, if an IT network is compromised, it should not affect the continued monitoring and control of the physical devices and processes of the OT network. One way to ensure such isolation is through an "air gap" architecture in which an organization's OT network has no communication interfaces, either wired or wireless, with the organization's IT system. While an air gap architecture provides a high level of security from external attacks, it poses challenges because it is sometimes necessary to exchange data between OT network and external networks to allow engineers, contractors, and vendors to operate, maintain, update, audit, and manage these networks.

Currently, such OT-IT data exchange relies on traditional removable media such as USB drives for file transfer. However, the use of removable USB drives poses high cybersecurity risks to the OT systems by increasing the risk of malware infection, data leakage, and unauthorized access. Additionally, the physical nature of these transfers can be time-consuming, error-prone and cumbersome, leading to inefficiencies in the data analysis and decision making.

What is therefore needed is a system and method that ensures integrity and security of external files and eliminates excessive use of removable media risks within air-gapped critical infrastructure networks.

SUMMARY OF THE DISCLOSURE

According to one aspect the present disclosure a system for secure data exchange between an operational technology network and an external information technology network has the external information technology network separated from the operational technology network via an air gap. The system includes a handheld computing device, a first central station coupled to the external information technology network including a hardware processor configured with program instructions and a receptacle for detachable coupling to the handheld computing device. The system also includes a second central station coupled to the operational technology network including a hardware processor configured with program instructions and a receptacle for detachable coupling to the handheld computing device. The system manages file transfers between the first central station and the second central station in which a file is uploaded to the detachable handheld device, and in which the handheld device is detachable and moveable from the first central station to the second central station or vice versa. Thereafter, the handheld device is attachable to the central station to which it has been moved to enable downloading the file. The first and second central stations are configured to authenticate the detachable handheld device before file transfer and to sanitize the handheld device.

According to another aspect the present disclosure describes a method for secure data exchange between an operational technology network and an external information technology network in which the two networks are separated via an air gap. The method utilizes a handheld computing device, a first central station coupled to the external information technology network including a hardware processor configured with program instructions and a receptacle for detachable coupling to the handheld computing device, and a second central station coupled to the operational technology network including a hardware processor configured with program instructions and a receptacle for detachable coupling to the handheld computing device. The method has file transfers occurring between the first central station and the second central station by uploading a file to the detachable handheld device, detaching and moving the handheld device from the first central station to the second central station or vice versa, attaching the handheld device to the central station to which it has been moved, and downloading the file. In accordance with such a method, the first and second central stations are configured to perform the further steps of authenticating the detachable handheld device before any file transfer, and for sanitizing the handheld device.

These and other aspects, features, and advantages can be appreciated from the following description of certain embodiments and the accompanying drawing figures and claims.

DETAILED DESCRIPTION OF CERTAIN EMBODIMENTS OF THE DISCLOSURE

The present disclosure describes a system and method for providing secure file transfer between a secured, air-gapped network, such as an operational technology network and an open (i.e., non-air gapped) network, such as an enterprise information technology network. Security controls are applied during transmission and to facilitate secure delivery to intended recipients inside critical infrastructure networks through detachable secure file transfer. Systems described herein incorporate a device referred to as a secure detachable file safe box which enables the file transfer to and from critical air gapped infrastructures. A detachable handheld device is utilized in a comprehensive secure file transfer method in which the files to be transferred are inspected for integrity and security based on verification of vendor contracting records and advance cybersecurity control checks across air gapped critical infrastructure.

Figure 1:
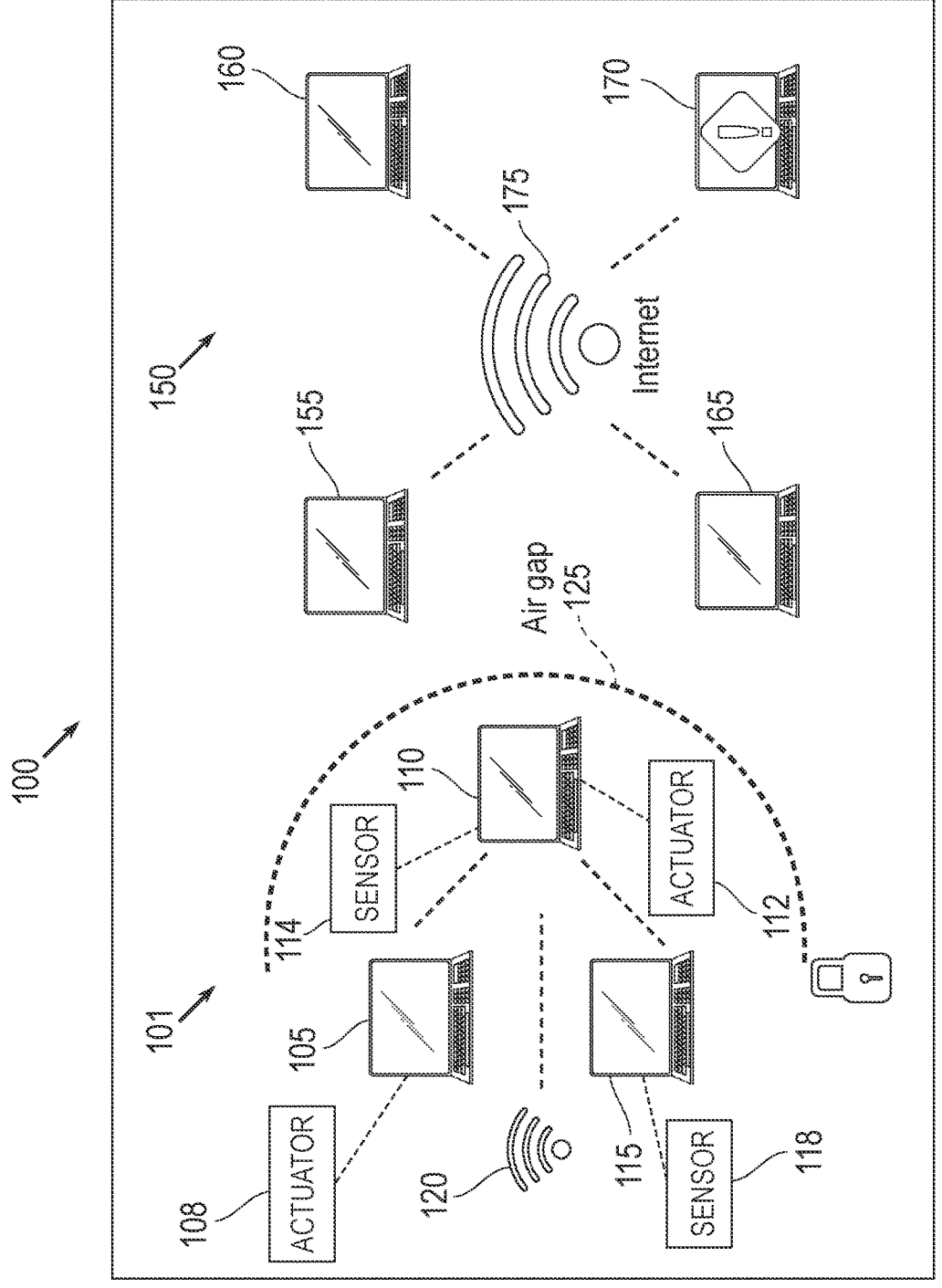
FIG. 1 is a schematic view of a conventional air gapped system including an operational technology (OT) network and an information technology (IT) network.

FIG. 1 is a schematic illustration of a conventional air-gapped system 100. The air-gapped system includes two separate networks, an operational technology (OT) network 101, and an information, or enterprise technology network 150. The OT network 101 is designed to control and monitor physical devices, processes, and events such as, for instance, fluid flows, valve switching, robotic operations, etc. In the schematized illustration of FIG. 1, the OT network 101 includes computing devices 105, 110, 115 as well as actuators 108, 112 and sensors 114, 118. Computing devices 105, 110, 115 can constitute, without limitation, general purpose computing devices, programmable logic controllers (PLCs), special purpose computers or hardware. Actuators 108, 112 control activation or movement of various control devices in the OT network, while sensors 114, 118 monitor physical parameters in the environment of components of the OT network, such as, for instance, fluid flow rates, pressure, temperature, and geographic location. The components of the OT network 101 can communicate using any of a variety of industrial communication protocols such as but not limited to Ethernet/IT, Fanuc Focas, Modbus, and LSV/2. Importantly, all communication between components of the OT network 101 is internal, and no communication occurs with any devices external to the OT network due to the presence of air gap 125. The air gap 125 connotes that there is not only no wired link between the OT network and the IT network 150 (or any other network), but that steps are taken to ensure that external wireless communications are blocked and prevented from being received by components of the OT network 101.

The IT network 150 includes computing devices 155, 160, 165, 170 which can be general purpose computers, or other computing devices that can operate as data servers, application servers, web servers, user workstations, etc. Importantly, the IT network is considered open as it is connected to the Internet 175 and, via the Internet, is connected to a vast number of other public networks. The exclamation mark shown in computing device 170 indicates that this device may be subject to a cyberattack and is a potential threat to the IT network 150 as a whole. The air gap 125 prevents this threat to the IT network 150 from becoming a threat to the OT network 101 since there is no path for data transfer, whether by wire or wireless connection, from which a virus or other type of threat can migrate from the IT network 150 to the OT network 101.

It should be understood that both the OT network 101 and the IT network 150 are vastly simplified for ease of illustration and explanation, and actual OT and IT networks can include hundreds or thousands of components, as will be appreciated by persons having ordinary skill in the art.

The air-gapped separation of the OT and IT networks 101, 150 brings up the question of how information is to be transferred from one to the other without threatening the OT network from threats that can migrate to it from the IT network. This is a significant concern as there are instances in which it is desired to change operational parameters or update software on the OT network 101 based on instructions from the IT network 150. Conversely, it is often desired to obtain data collected by the various components of OT network for storage and review in the IT network.

Figure 2:
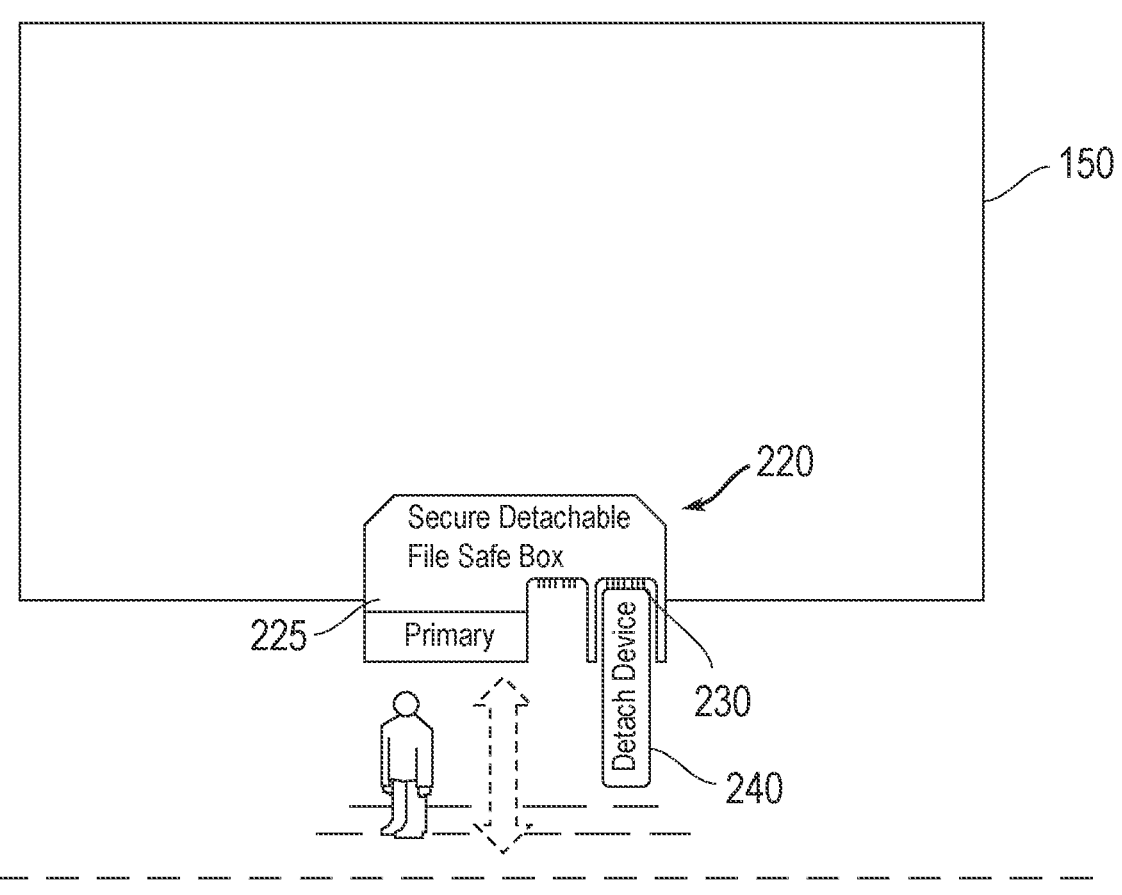
FIG. 2 is a schematic illustration of an embodiment of a system for secure data exchange between an OT network and an external network in air-gapped environment according to the present disclosure.
Figure 2:
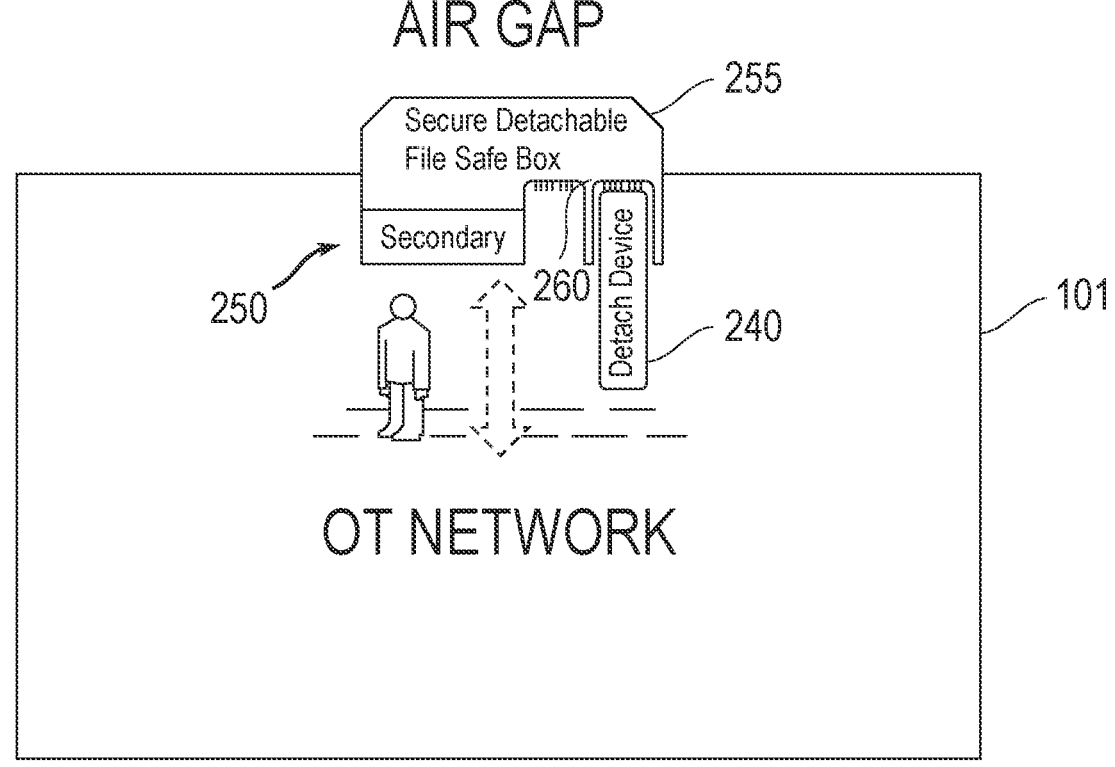

FIG. 2 is a schematic system illustration of the solution to this problem presented herein. As shown in FIG. 2, the IT network 150 is equipped with a primary secure detachable file safe box 220, and the OT network 101 is equipped with a secondary secure detachable file safe box 250. The primary detachable safe box 220 comprises a first central station device 225 having a receptacle 230 to which a detachable handheld device 240 can be ported and detached therefrom. The first central station device 225 is coupled to and communicates with IT network 150.

Secondary secure detachable file safe box 250 comprises a second central station device 255 having a receptacle 260 to which the detachable handheld device 240 can also be ported and detached therefrom.

The handheld device 240 is designed to automatically physically lock to either of the first and second station devices 225, 255. Two-factor authentication is required for the user to physically unlock the handheld device 240. The handheld device 240 is tracked upon being unlocked. The first and second central station devices 225, 255 each include one or more hardware processors coupled to local and/or main memory. Both first and second central station devices 225, 255 are configured with software for advanced malware inspection. In operation, the first central station device 225 (on the IT Network Side) automatically syncs current security updates to the handheld device 240 using code executing in a hardware processor that configures the processor for this purpose. Once the handheld device 240 is detached from the first central station device 225 (IT network side) and attached to the second central station device 255 (OT network side), the handheld device 240 is automatically updated with the latest security updates prior to file transfer, using code that suitably configures the processor for this purpose.

Figure 3:
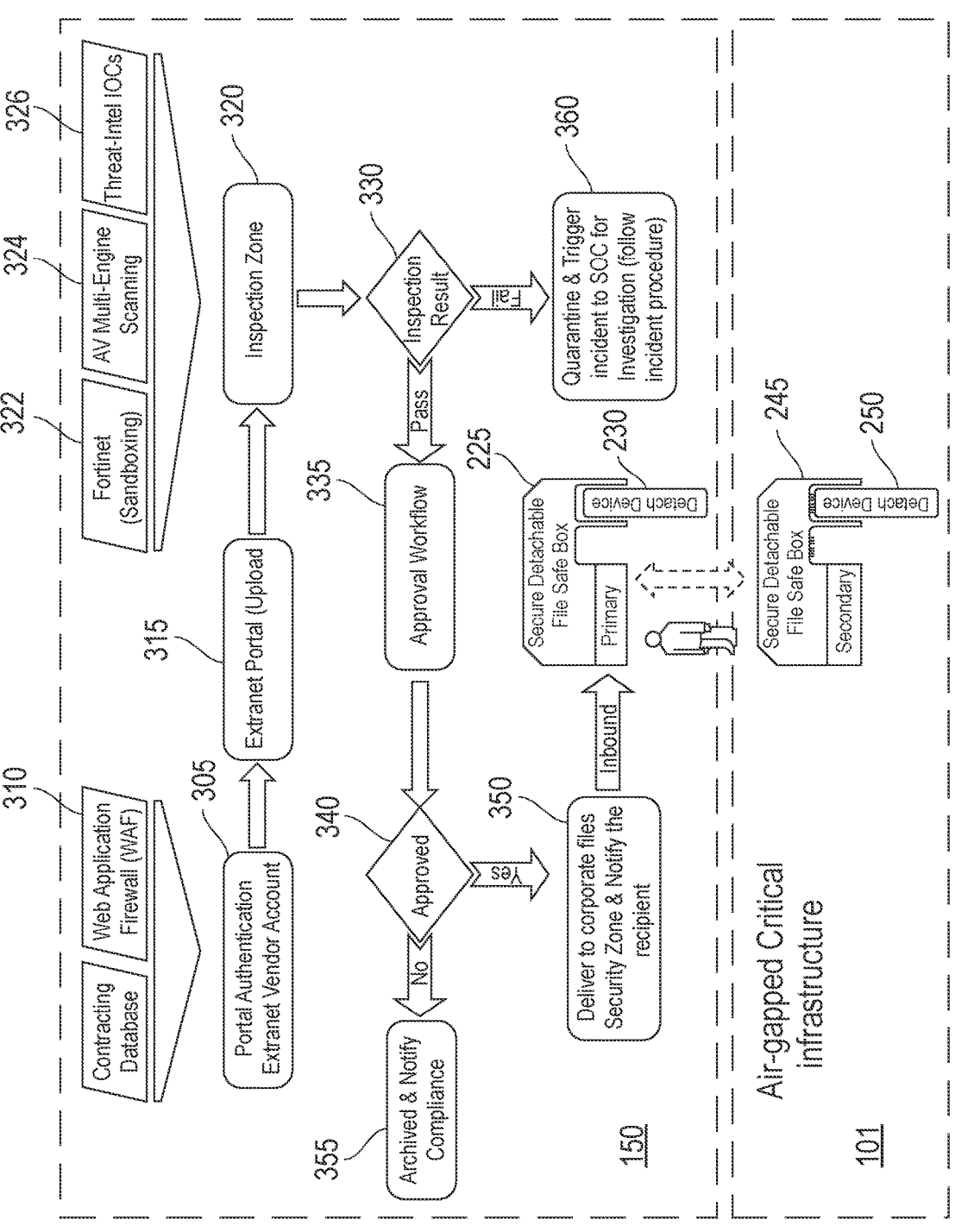
FIG. 3 is a flow diagram of an embodiment of a security vetting process for the first central station of an IT network according to the present disclosure.

FIG. 3 is a flow diagram of an embodiment of a security vetting process for the first central station according to the present disclosure. The following processes are performed at the first central station 225 using one or more hardware processors configured with computer-executable instructions. An external entity, such as a vendor, that seeks to transfer files accesses an authentication portal 305 through a Web Application Firewall (WAF) 310 to start transferring intended files. The authentication portal 305 operates under control of a (typically, hardware) processor configured by code which causes the processor to implement checks of the external entity against data maintained by or accessible to the first central station 225 comprising an approved list of verified vendors with active contract(s) and valid cybersecurity compliance certificate(s). Upon confirming that the vendor is on the approved list, the portal notifies the vendor that it is authorized to upload intended files and submit them to intended recipient via an extranet port in step 315. A submitted file is directed to an inspection zone 320. The inspection zone 320 comprises a module configured by code executing in a (typically, hardware) processor that starts and controls the process of testing, analyzing, scanning, validating and applying all cybersecurity measures to ensure integrity and security of the file. The module of the inspection zone 320 is programmed so that it accesses various tools in this process including sandboxing 322, multi-engine scanning 324 and databases having threat information (with indications of compromise) 326. Based on the result 330 of the inspection process by the inspection zone 320, the file is redirected under control of the code running in a programmed module, such as the inspection zone module. If the file passes inspection it is directed through an approval workflow process 335 to be approved/rejected by an intended management recipient 340. Once the intended management recipient has approved the workflow, the file is delivered to a corporate files secure zone and a notification is sent to the management recipient. If the file is not approved by the management recipient (although it has passed inspection), the file is archived and a compliance division is notified 355. If the file(s) is rejected at the inspection zone 320, then a further process executing in the processor causes an incident to be triggered for a Security Operations Center (SOC) 360 to start an investigation. A file that has passed inspection and has been approved by the pertinent recipient can be transferred securely from the IT network to the air-gapped OT network through the detachable handheld device 240.

Figure 4:
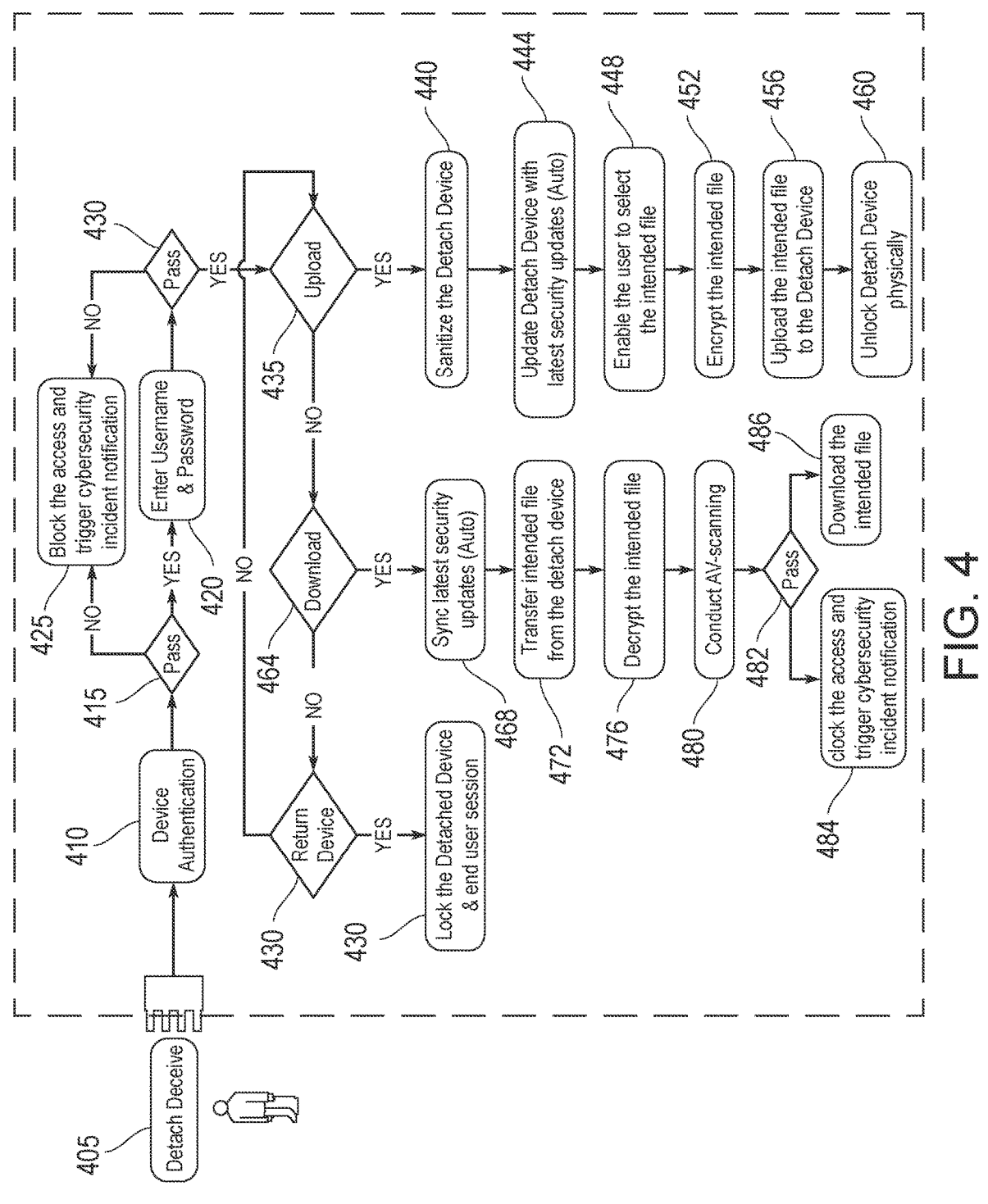
FIG. 4 is a flow diagram of a method of transferring files between an IT network to the OT network across an air gap according to an embodiment of the present disclosure.

FIG. 4 is a flow diagram of a method of transferring files between an IT network to the OT network across an air gap according to an embodiment of the present disclosure. In a first step 405, the handheld device 240 is physically inserted into the corresponding receptacle 230 in the first central station 220. The handheld device 240 is authenticated in a following step 410 upon attachment to the first central station, by code executing in a processor at the first central station. In step 415 it is determined whether the handheld device 240 is authenticated. If the handheld device 240 is authenticated, in step 420 the user is allowed to enter a username and password into the handheld device (e.g., via a user interface, in a conventional manner). If the user is not authenticated in step 415, the user is blocked from access in step 425 and a cybersecurity notification is generated. If the username and password are accepted in step 420, the user specifies whether to upload a file, download a file, or return the handheld device 240 to its receptacle 230. Depending upon the choice, the flow divides into three separate branches as shown in FIG. 4.

If "upload" is selected after acceptance of the username and password in step 430, then the process flow follows a first branch starting with step 435. In a following step 440, the first central station executes code in a processor to configure the processor to sanitize the handheld device. The sanitization step involves permanently deleting the content of the handheld device to ensure that any data initially present on the device cannot be recovered. This measure prevents any possible propagation of malware. In step 444, the first central station delivers updates to the handheld device 240 with current security information by data transfer. The security information is used, subsequently, for a malware engine executed on the second central station handheld device. In step 448, the user is enabled to select a file for uploading, in part, because the handheld device 240 has been authenticated and the username/password pair has been accepted. The selected file is encrypted in step 452 using any conventional encryption algorithm under control of a (typically, hardware) processor suitably configured to so-encrypt the file. In step 456, the selected file is uploaded to the handheld device 240. In the final step of the branch, the user is enabled to physically unlock and disconnect the handheld device 240 in order to move the handheld device to the second central station 250 in the air-gapped critical environment.

After the handheld device 240 has been securely attached to the receptacle 260 of the second central station, a new round of authentication is performed in step 460. Again, once the handheld device is authenticated substantially as described above using code executing in a processor, then the user is allowed to enter a username and password. After the user has been authorized, in step 464 the user can select the "download" option. In step 468, the second central station device 255, under control of code executing in at least one of its hardware processors, automatically syncs the current security updates stored on the handheld device 240 for an advanced malware engine. In step 472, the selected file previously uploaded is transferred from the handheld device 240 to the second central station device 255. The uploaded file is decrypted in step 476 and scanned for threats (e.g., viruses) in step 480, again, using a processor suitably configured by code to perform this task. If the file passes the anti-virus scan in step 482, the file is downloaded to the central station device 255 in step 484. If the file does not pass the anti-virus scan in step 482, access to the second central station 250 is blocked by the code executing in the processor and cybersecurity incident notification is triggered in step 486.

Analogous steps are performed to transfer files in the reverse direction from the OT network to the IT network. In this case, the upload option is selected at a user interface at the second central station 250 and the handheld device, with the uploaded file, is transferred from second central station 250 to the first central station 220. The only notable difference between the reverse transfer (OT to IT) from the first type of transfer (IT to OT) is that syncing for security updates takes place only at the first central station 220 on the IT network side. The reverse transfer can also include an extra sanitization of the handheld device, at both the first and second central stations 220, 250 in certain implementations.

Figure 5:
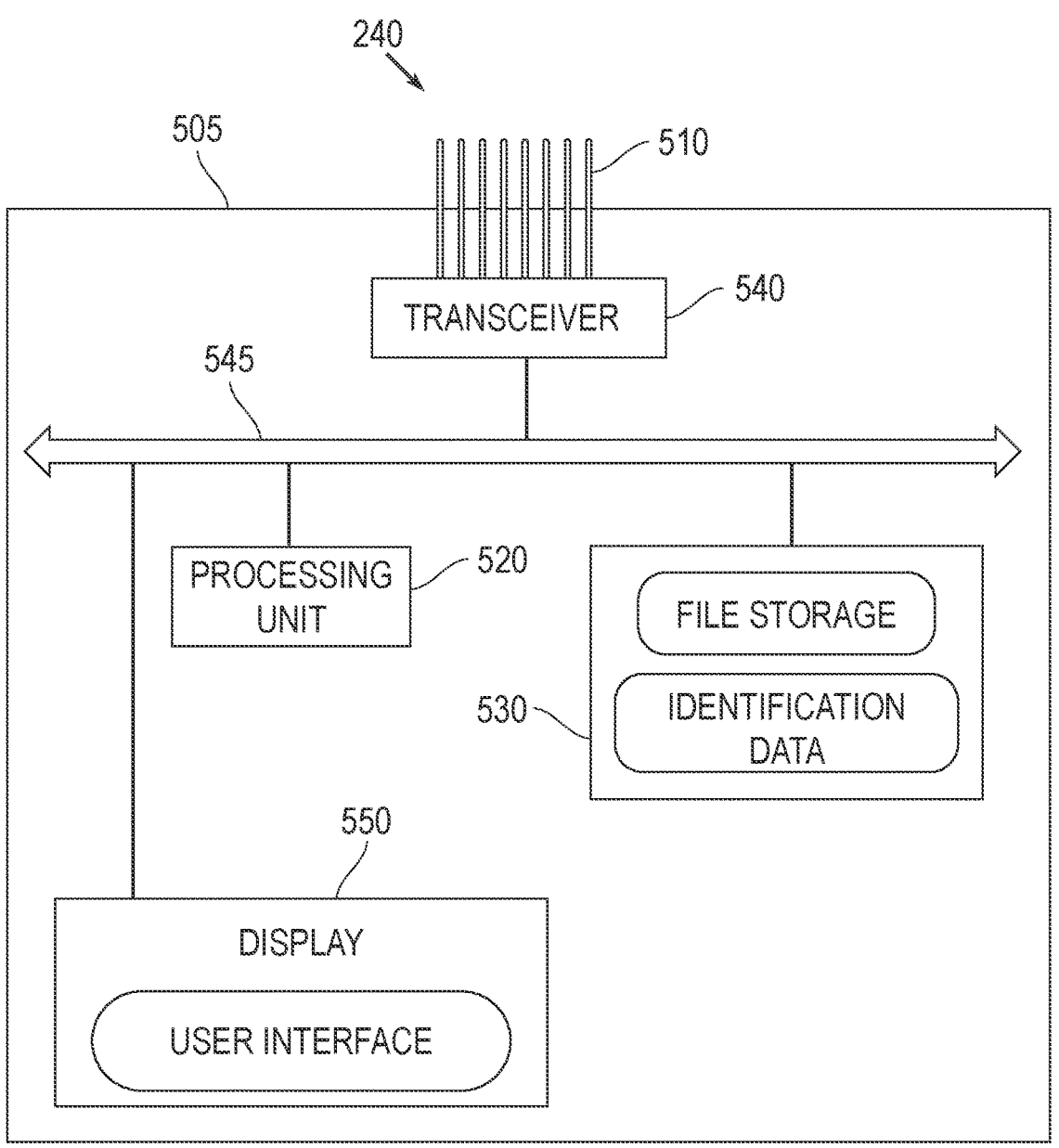
FIG. 5 is a schematic block diagram of a handheld device according to an embodiment of the present disclosure.

FIG. 5 is a schematic block diagram of a handheld device 240 according to an embodiment of the present disclosure. The handheld device 2440 has a housing 505 which can have a variety of form factors. In some embodiments, the handheld device 240 can have a size and dimension approximately similar to a standard handheld mobile device. On the outside of the housing is a male/female port 510 that inserts into a corresponding female/male receptacle of the central station devices. Manual controls such as buttons or switches can also be situated on the surface of the housing 505. Data is transferred via the port 510 both to and from the handheld device as described above during uploads and downloads. Electronic components are positioned internally within the housing 505 of the device. Among the electronic components are a hardware processor 520, one or more memory units 530 coupled to the processor, a transceiver 540 coupled to the processor 520 and the port, and a display device 550. The processor 520 is coupled to the memory units via a bus 545. The processor 520 is configured to generate a user interface on the display device 550 through which the user can interact either via touchscreen or manual controls to input options as described above. Other input and output devices can also be used. The memory units 530 are used for file storage and also include stored identification data for authentication of the handheld device at the central station devices.

The system and method for providing secure file transfer over an air gap has several advantageous features. The system provides a single channel for approved external entities to send files to internal critical infrastructures for better file management and security control. Close monitoring and integrity checks can be maintained during transit. Updates with increased cybersecurity capabilities result in resilience in detection, protection and response domains. Advanced malware detection methods are applied on all transfer files. Significantly, excessive use of removable media within critical infrastructure networks is eliminated. The systems and methods described herein enable ongoing evaluation of vendor file-sharing cybersecurity compliance and provide prompt response to any infected file by disabling vendor accounts. Zero-day malware infection attempts are prevented.

Processing components described herein (e.g., of the central station devices and handheld device) can include, but are not limited to, a processing unit having one or more processing cores or parallel hardware or virtual processors, a system memory, and a system bus that couples various system components including the system memory to the processing unit. The system bus may be any of several types of bus structures selected from a memory bus or memory controller, a peripheral bus, and a local bus using any of a variety of bus architectures. The system memory includes computer storage media in the form of volatile and/or nonvolatile memory such as read only memory (ROM) and random access memory (RAM). A basic input/output system (BIOS) containing the basic routines that help to transfer information between elements within the computing system, such as during start-up, is typically stored in ROM. RAM typically contains data and/or software that are immediately accessible to and/or presently being operated on by the processing unit. By way of example, and not limitation, the RAM can include a portion of the operating system, application programs, other executable software, and program data.

A user can enter commands and information into the computing system through input devices such as a keyboard, touchscreen, or software or hardware input buttons, a microphone, a pointing device and/or scrolling input component, such as a mouse, trackball or touch pad. The microphone can cooperate with speech recognition software. These and other input devices are often connected to the processing unit through a user input interface that is coupled to the system bus, but can be connected by other interface and bus structures, such as a parallel port, game port, or a universal serial bus (USB). A display monitor or other type of display screen device is also connected to the system bus via an interface, such as a display interface. In addition to the monitor, computing devices may also include other peripheral output devices such as speakers, a vibrator, lights, and other output devices, which may be connected through an output peripheral interface.

Applications described herein, such as those that execute the process flows described above include but are not limited to software applications and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components or steps described and illustrated with reference to the figures are required for all embodiments or arrangements.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and "comprising", when used in this specification, specify the presence of stated features, integers, steps, operations, elements, or components, but do not preclude the presence or addition of one or more other features, integers, steps, operations, elements, components, or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A system for secure data exchange between an operational technology network and an external information technology network separated from the operational technology network via an air gap comprising:

a handheld computing device;

a first central station coupled to the external information technology network including a processor configured with program instructions and a receptacle for detachable coupling to the handheld computing device; and a second central station coupled to the operational technology network including a processor configured with program instructions and a receptacle for detachable coupling to the handheld computing device;

wherein data transfers occur between the first central station and the second central station by uploading data to the detachable handheld device, detaching and moving the handheld device from the first central station to the second central station or vice versa, attaching the handheld device to the central station to which it has been moved, and downloading the data.

2. The system of claim 1, wherein the first central station and the second central station are configured to authenticate the handheld device upon attachment of the handheld device at the corresponding receptacles of the first and second central stations.

3. The system of claim 2, wherein the first central station and the second central station are configured to authenticate a user of the handheld device.

4. The system of claim 2, wherein the second central station is configured to authenticate the handheld device after transfer of the handheld device from the first central station to the second central station.

5. The system of claim 1, wherein the first central station is configured to sanitize the handheld device by removing all files stored on the handheld device prior to uploading the data to the handheld device.

6. The system of claim 5, wherein the first central station is configured to update security information on the handheld device after sanitizing the handheld device and before uploading the data to the handheld device.

7. The system of claim 6, wherein the second central station is configured to update security information based on the security information updated on the handheld device at the first central station.

8. The system of claim 1, wherein the second central station is configured to further sanitize the handheld device when data is uploaded at a first central station coupled to an operational technology network.

9. A method for secure data exchange between an operational technology network and an external information technology network separated from the operational technology network via an air gap comprising:
uploading data at a first central station coupled to either: i) and external information technology network or ii) the operational technology network onto an attached secure handheld computing device;
detaching the handheld held device from the first central station;
transferring the handheld computing device to a second central station coupled to the other of the i) external information technology network or ii) the operational technology network;
attaching the secure handheld device to the second central station; and downloading the data at the second central station.

10. The method of claim 9, further comprising authenticating the handheld device at the first central station.

11. The method of claim 10, further comprising authenticating a user initiating the upload at the first central station.

12. The method of claim 10, further comprising authenticating the handheld device at the second central station after transfer of the handheld device from the first central station to the second central station.

13. The method of claim 9, further comprising sanitizing the handheld device by removing all files stored on the handheld device at the first central station prior to uploading the data to the handheld device.

14. The method of claim 13, further comprising updating security information on the handheld device after sanitizing the handheld device and before uploading the data to the handheld device.

15. The method of 14, further comprising synchronizing the security information updated on the handheld device at the second central station.

16. The method of claim 9, further comprising, additionally sanitizing the handheld device at the second central station when data is uploaded at a first central station coupled to an operational technology network.

17. A system for secure data exchange between an operational technology network and an external information technology network separated from the operational technology network via an air gap comprising:
a handheld computing device;
a first central station coupled to the external information technology network including a processor configured with program instructions and a receptacle for detachable coupling to the handheld computing device; and
a second central station coupled to the operational technology network including a processor configured with program instructions and a receptacle for detachable coupling to the handheld computing device;
wherein data transfers occur between the first central station and the second central station by uploading data to the detachable handheld device, detaching and moving the handheld device from the first central station to the second central station or vice versa, attaching the handheld device to the central station to which it has been moved, and downloading the data, and
wherein the first central station is configured to sanitize the handheld device by removing all files stored on the handheld device prior to uploading the data to the handheld device.

* * * * *